June 28, 1927.

W. G. COX 1,634,095

SHOCK ABSORBER FOR SPRING VEHICLES

Filed March 15, 1926    4 Sheets-Sheet 1

Inventor

W·G·Cox

By Fisher, Moser & Mook
Attorney

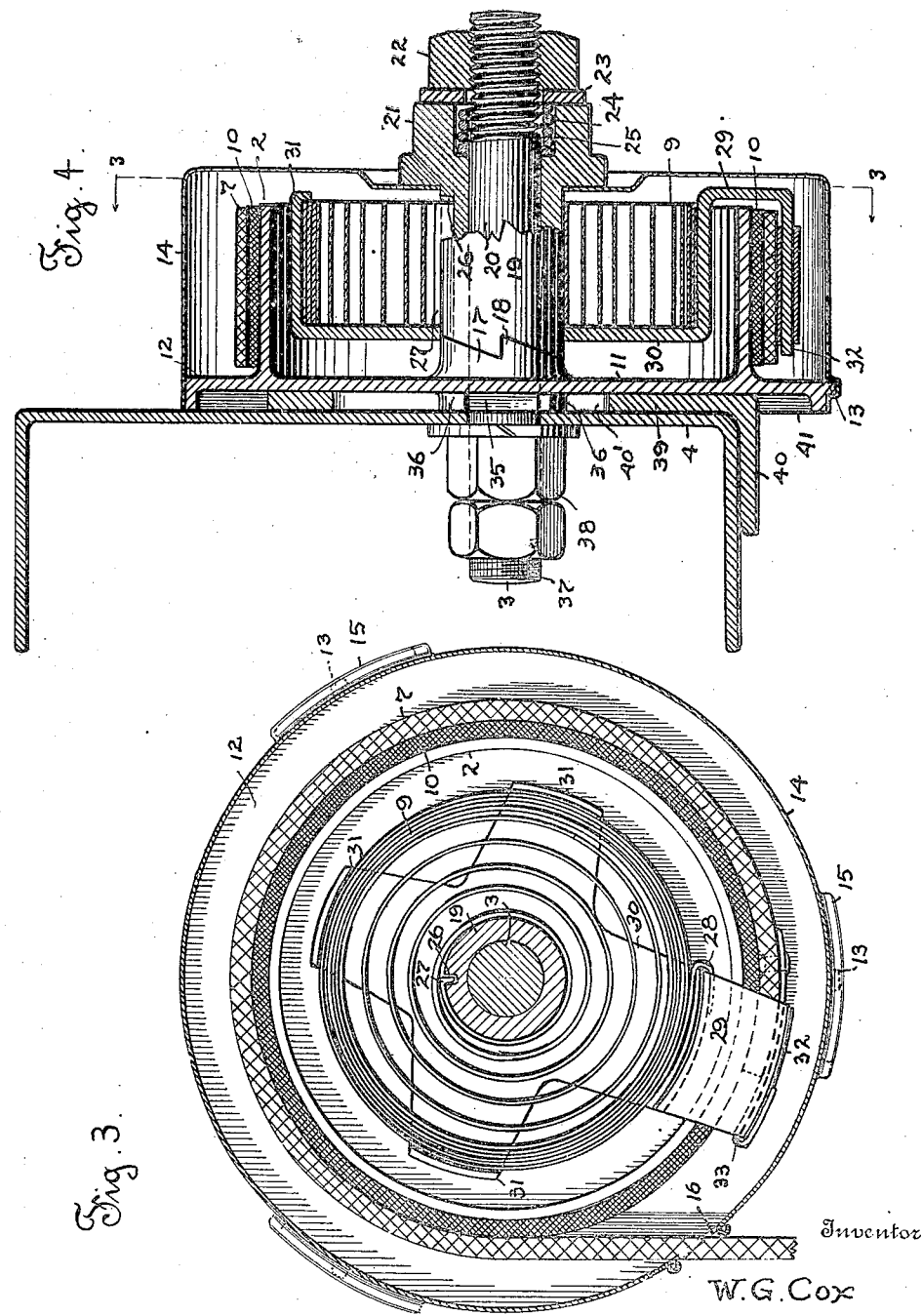

June 28, 1927.
W. G. COX
1,634,095
SHOCK ABSORBER FOR SPRING VEHICLES
Filed March 15, 1926  4 Sheets-Sheet 3
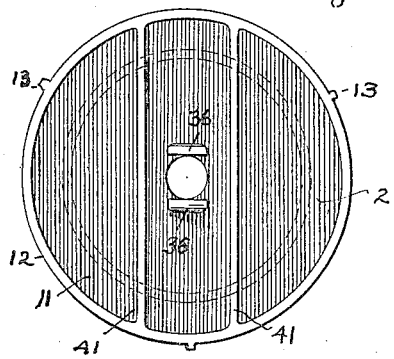
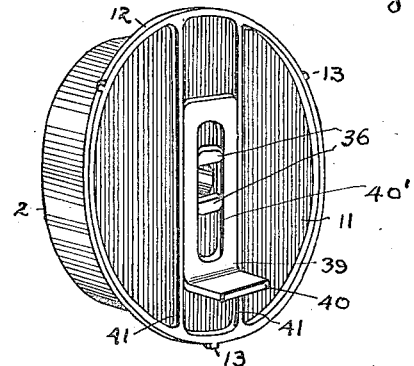
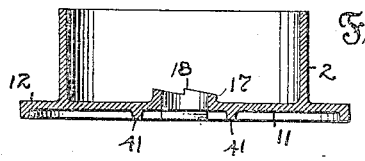
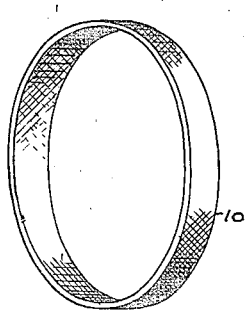
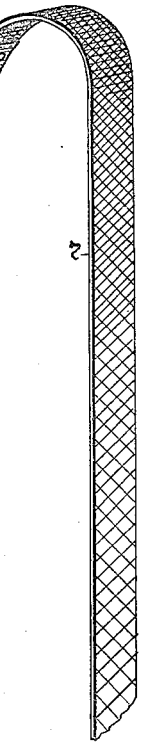
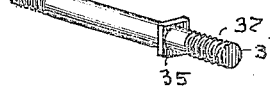
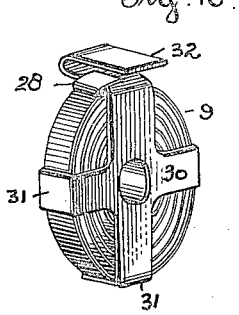
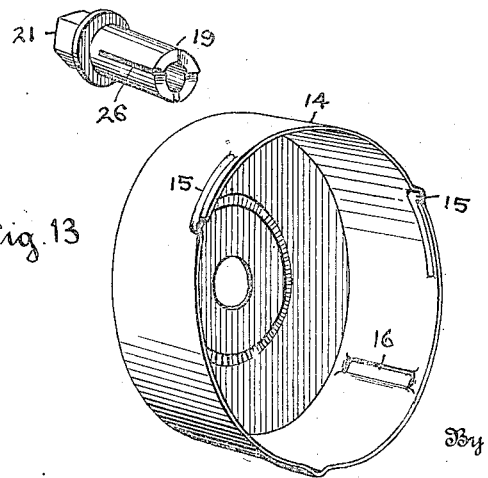
Inventor
W. G. Cox
By Fisher, Meser & Hulcook
Attorney June 28, 1927.

W. G. COX 1,634,095

SHOCK ABSORBER FOR SPRING VEHICLES

Filed March 15, 1926 4 Sheets-Sheet 4

Inventor
W. G. Cox

Attorney

Patented June 28, 1927.

1,634,095

UNITED STATES PATENT OFFICE.

WILLIAM G. COX, OF CLEVELAND, OHIO.

SHOCK ABSORBER FOR SPRING VEHICLES.

Application filed March 15, 1926. Serial No. 94,753.

My invention relates to an improvement in shock absorbers for automobiles, and in general my object is to provide a simple device which will check, smoothly and noiselessly, all sudden and objectionable reflex actions of a vehicle suspension spring and thereby relieve the body of the car of objectionable shocks and jerky movements which would otherwise be transmitted thereto in traveling rapidly over a rough road. I am aware that it is not broadly new to provide braking devices for that purpose, and therefore disclaim the combination of a stationary drum, with a friction shoe, a tension belt or band, and a retrieving or retracting spring, in view of Letters Patent of the United States No. 901,974, granted to T. Veitch, January 26, 1909, and the British patent to Christophe et al., No. 6411 of March 16, 1907. Reference may also be had to my own Letters Patent No. 1,110,311, of September 15, 1911, for a rebound brake for spring vehicles. However, I am not aware of a shock absorber constructed as herein shown and described, in which all of the co-operating parts may be readily assembled and secured together by a single bolt and attached to an automobile in the simple and expeditious manner as hereinafter set forth, and wherein the retrieving spring may be so easily adjusted to any desired working tension and in which the parts subjected to wear may be so easily replaced or adjusted to meet varying needs and conditions.

Figure 1:
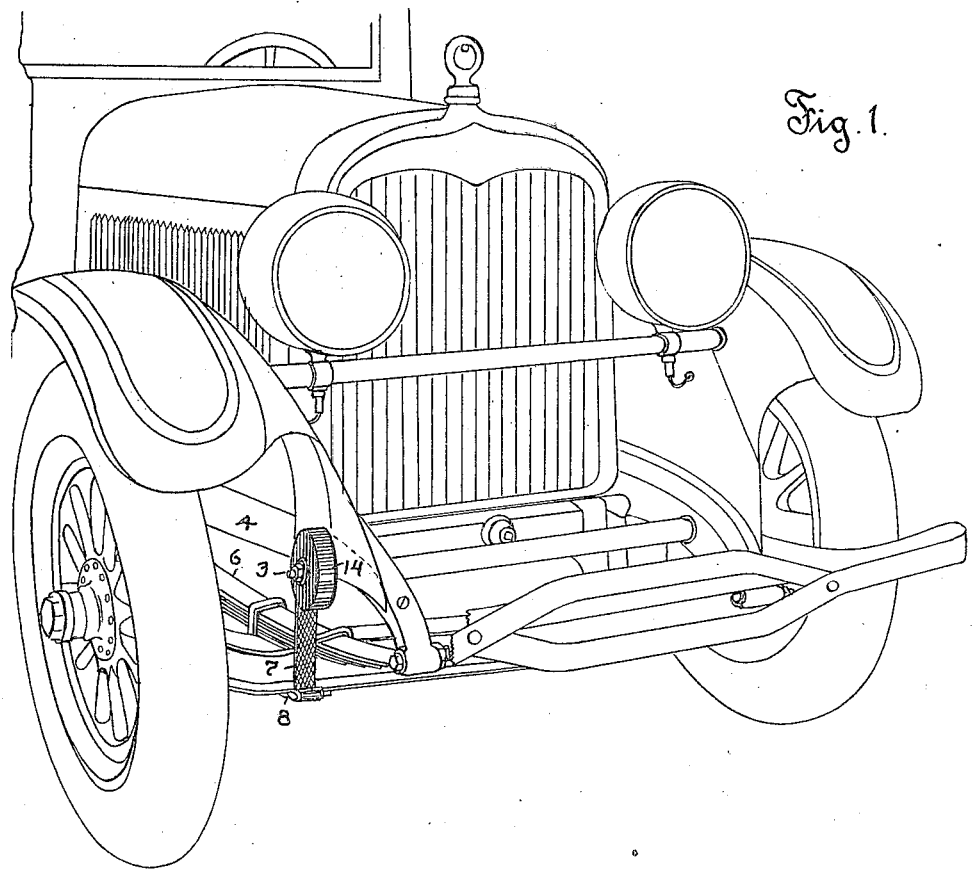
Figure 2:
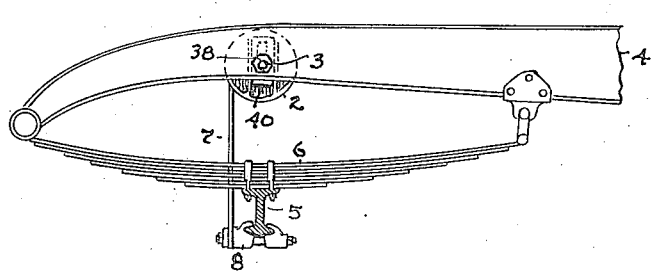
Figure 14:
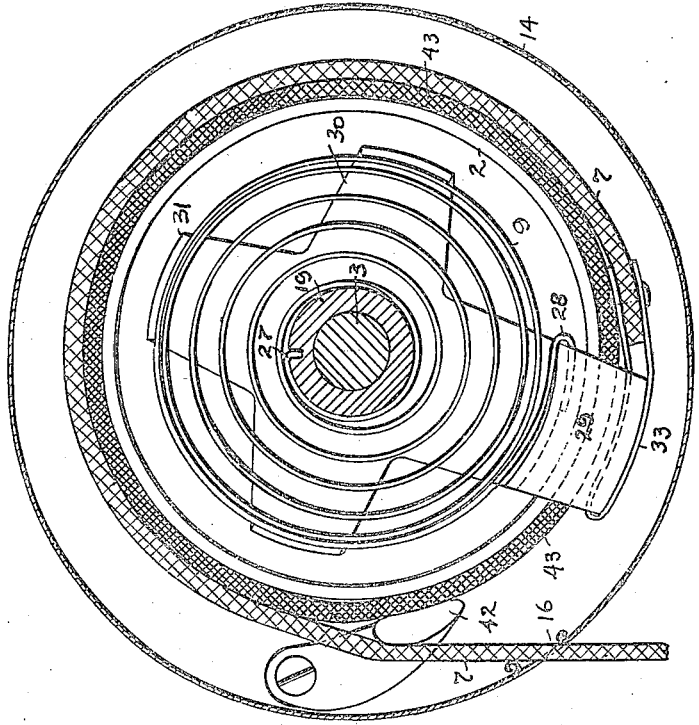

In the accompanying drawings, Fig. 1 is a perspective view of the front end of an automobile equipped with my improved shock absorber, and Fig. 2 is a side view of the same shock absorber connected to the chassis frame and axle midway between the ends of a semi-elliptic suspension spring. Fig. 3 is an enlarged side view and section of the shock absorber, on line 3—3 of Fig. 4, and Fig. 4 is a vertical section of the channel member of a chassis frame and the shock absorber clamped in a stationary position thereon. Fig. 5 is a rear view, Fig. 6 a perspective view, and Fig. 7 a sectional view of the stationary member or drum. Fig. 8 is a perspective view of the friction ring or brakeband; Fig. 9 of the snubbing strap; Fig. 10 of the retracting spring and cage; Fig. 11 of the attachment bolt; and Fig. 12 of the spring winder. Fig. 13 is a perspective view of the cover. Fig. 14 is a side view and section of a modification.

The present shock absorbing device comprises a cylindrical body, such as a drum 2, which is adapted to be clamped by a single bolt 3 to a fixed part of the automobile frame, for example, a channeled side member 4 of pressed steel.

The common practice is to mount such devices at opposite sides of the vehicle body upon each side member 4 above an axle 5 at a suitable point intermediate the shackle ends of a suspension spring 6 to permit a flexible connection to be made with the axle. Thus a flexible belt or strap 7 is connected to the axle by a suitable clamp or fitting 8, the belt passing upwardly and thence partly around drum 2 to a coiled retriever spring 9 housed within the drum or cylinder. Belt 7 may either engage the cylindrical surface of the drum or pass around a friction shoe or ring 10 loosely sleeved upon the drum. The belt encircles about one-half of the cylindrical surface when the vehicle spring 6 is compressed under its normal load, and wraps around the drum in greater degree when the vehicle spring 6 is compressed additionally and the tension in that spring is increased. Thus when a recoil or rebound takes place and the vehicle frame and axle separate or move apart, the belt 7 and retriever spring 9 operate together to brake or check such movement in lesser or greater degree dependent upon the frictional area covered by the belt, thereby preventing a sudden upward throw of the vehicle body, or abrupt drop of the axle in respect to the body, and in that way dampening the recoil movement of the spring and the vibrations and shocks transmitted to the vehicle body in riding over rough surfaces.

Drum 2 is open at its front but closed at its rear by a wall 11 which extends as a flange 12 beyond the circular face of the drum. The periphery of flange 12 may be provided with a series of locking projections 13 at uniformly spaced intervals to permit convenient slip attachment of a cover 14 having a circular flange or wall in which several L-shaped grooves or channels 15 are formed to receive the projections 13, whereby the cover may be locked upon the drum and also rotated more or less while locked in that way.

Free rotation of cover 14 is desirable because it facilitates the mounting of the drum in various positions upon the chassis frame, either forwardly or rearwardly of the axle, while permitting belt 7 to extend either perpendicularly or on slanting lines from the drum to the axle and in a straight line through a narrow slot 16 in the curved wall of the cover. A slot or opening 16 not much wider than the thickness of the belt may be used, so that this opening in the cover may be practically closed by the belt against the admission of dirt. On the other hand a narrow slot demands a rotatable cover to permit the slot to be set in various radial positions for the belt if the drum is to be mounted in different positions as stated.

When the cover is properly adjusted it is clamped against rotation and removal by the following means: Extending forwardly from rear wall 11 at the center of the drum is a short hub 17 having a series of ratchet teeth 18 which under normal conditions interlock with a corresponding number of teeth at the inner end of a spring-winding arbor 19 sleeved upon a clamping and supporting bolt 3 for the drum. Arbor 19 is provided with an enlarged hexagonal head 21 which is located outside of cover 14 to permit a wrench to be applied thereto, and cover 14 has a central opening through which the round shank of arbor 19 extends. Head 21 bears against the cover and clamps it rigidly upon the drum when a nut 22 is screwed upon the outer end 20 of clamping bolt 3 against a lock washer 23. Furthermore, when nut 22 is tightened the spring-winding arbor 19 is pressed tightly against ratchet teeth 18 and cannot move longitudinally or rotate upon bolt 3. To permit rotation of arbor 19 in one direction it is first necessary to back the nut 22 a sufficient distance on the bolt so that the ratchet teeth may ride over and clear each other, although when the nut is backed as stated the arbor is still prevented from moving longitudinally on clamping bolt 3 unless force is applied rotatably to head 21 by means of a wrench to overcome the tension of a compression spring 24 which is confined within an axial recess 25 in head 21 and which spring tends to press the arbor constantly in the direction of the locking teeth. The constant compression of spring 24 also serves to lock nut 22 upon bolt 3.

The round surface of arbor 19 is provided with a longitudinal groove 26 to receive and anchor the bent extremity 27 of the inner coil of retriever spring 9, and the outer coil or opposite end of this retriever spring is provided with a hook 28 which connects with one arm 29 of an open cage or spider 30 for holding said spring. Spider 30 is sleeved rotatably upon arbor 19, or it may turn around hub 17 if desired, and arm 29 is longer than the other bent arms 31 of the spider and bent reversely at its outer end to provide a finger or branch 32 in overhanging relation to the circular braking surface of drum 2, and to which finger one end of belt 7 may be detachably connected. Finger 32 extends toward and terminates relatively near flange 12 of drum 2, and the extremity of belt 7 may be provided with a flexible loop, or a metal loop member 33, adapted to slip over the finger before the spider is introduced into the drum so that the belt cannot be accidently disconnected after the parts are assembled. The pull on belt 7 is transmitted to the spider and therethrough to the retriever spring which serves to take up all slack in the belt and keep it under tension at all times as well as to promptly retrieve and wind the belt around the drum upon each compressive movement of the vehicle suspension spring.

To permit the retriever spring and other parts of the device to be readily assembled and secured together for handling and shipment, and also to facilitate the attachment of the complete device to an automobile, clamping bolt 3 is formed with a squared or flattened enlargement 35 adapted to anchor the inner end of the bolt within or upon wall 11 of drum 2 opposite hub 17 through which the round shank of the bolt extends. Thus in tightening nut 22 the bolt itself will be tightly clamped centrally within the drum. Enlargement 35 is also utilized to prevent the bolt from rotating, the square sides of the enlargement being made to fit within a corresponding recess or a pair of integral lugs 36 at the mouth of the bolt opening in wall 11. The rear or short end 37 of bolt 3 is adapted to project through a single opening bored in the flat side wall of channel member 4, and one or more nuts 38 may be used to clamp the bolt rigidly to this side member of the chassis frame, thereby also clamping the drum rigidly in a stationary position thereon. However, all turning or rotatable movements of the drum must be prevented, and inasmuch as a single clamping bolt is employed and that bolt is placed at the axis of the drum such rotation is prevented in a simple way by using a separate flat angle bar 39 having one or more openings or a slot 40' in its longer branch through which clamping bolt 3 may project when the bar is placed flat against the rear face of wall 11 of drum 2 with the angle or foot portion 40 of the bar extending underneath the bottom flange of channel member 4, as shown in Fig. 4. If a series of round openings or a slot 40' is used in bar 39, the bar may be adjusted vertically to bring its foot portion against the bottom of the channel member, and such adjustment is convenient where the channel members are provided with bolt openings by the automobile manufacturer for the attachment of shock absorbers, and in case the position of such bolt openings vary in different makes of vehicles. The slot in bar 39 also accommodates the lugs 36 at the rear of wall 11 and these lugs may be utilized to lock the bar from turning independently of the drum, although parallel ribs 41 are also cast or stamped in wall 11 to guide bar 39 in its adjustable sliding movements and to prevent independent rotation of the drum when the right angled extremity or foot of the bar extends beneath the bottom of channel member 4. By lowering the bar it is possible to rotate the drum in limited degree upon its axis, or until the right-angled extremity engages the bottom of channel member 4. Such adjustments facilitate the attachment of the drum in many different working positions upon the chassis frame, and only a single bolt opening and clamping bolt is required. And, when the drum is fixed in place, the tension of the retriever spring may be readily changed by applying a wrench without unclamping the drum from its support. The cover and spring-winding arbor and the spring cage may also be readily removed and replaced without unclamping the drum from its support, notwithstanding that a single clamping bolt is employed.

The friction shoe or ring 10 shown in Figs. 3 and 4 may be made of wood or metal, or it may comprise a hard fiber or a composition possessing lubricating properties. This ring may also be made of woven materials, or a treated flexible fabric such as commonly employed in brakes or clutches. In Fig. 14. I show a clamping member 42 for the friction band or ring 43, which ring in this instance may be a treated flexible fabric, and member 42 may be pivoted to the drum where belt 7 may ride over it and tend to press its clamping end against the friction band, thereby taking up any slack in the endless friction band.

What I claim is:

1. A shock absorber for spring vehicles, comprising a cylindrical body having a flange provided with radial projections, a friction belt having a retriever spring within said body, and a cover for said parts having a passage for the belt, said cover also having interlocking bayonet-lock connections with said radial projections permitting rotation of the cover while locked to said body.

2. A shock absorber for spring vehicles, comprising a drum, a friction belt for said drum, a retriever spring for said belt, an arbor in ratchet connection with said drum adapted to wind said spring, and a compression spring and nut adapted to be used jointly to lock said arbor against rotation.

3. A shock absorber for spring vehicles, comprising a drum having a central portion formed with ratchet teeth, a clamping bolt extending through said ratchet portion, a spring-winding arbor sleeved upon said bolt having ratchet teeth, a retriever spring connected to said arbor, a belt extending around said drum and connected to said spring, and adjustable means upon said bolt adapted to impart a yielding locking pressure longitudinally upon said arbor.

4. A shock absorber for spring vehicles, comprising a drum having a hub formed with ratchet teeth, a bolt extending through said hub, a rotatable arbor sleeved upon said bolt having teeth engaging the teeth on said hub, a nut upon said bolt adapted to lock said arbor in interlocking connection with said hub teeth, a compression spring interposed between said arbor and nut adapted to maintain a yielding locking connection between the arbor and hub and permit said nut to be retired, said arbor having means adapted to facilitate rotation thereof when said nut is retired, and a belt extending around said drum having a retriever spring connected with said arbor.

5. A shock absorber for spring vehicles, comprising a drum, a belt around said drum, a retriever spring connected with said belt, a rotatable arbor for winding said spring, said drum and arbor having interlocking teeth, a cover for said drum having an opening through which said arbor extends, a wrench-engaging enlargement upon said arbor exposed outside of said drum, a coiled compression spring bearing against one end of said arbor, and an adjustable nut bearing against said spring.

6. A shock absorber for spring vehicles, comprising a drum having a rear wall formed with parallel ribs, a friction belt on the drum, a retriever spring for the belt, a winding arbor for the spring, a bolt adapted to interlock with the drum to support said arbor, a clamping nut on said bolt adapted to lock the arbor, said bolt extending through a wall of said drum to permit the drum to be clamped upon a support, and a separate angle member connected to the bolt in interlocking connection with the ribs on said drum adapted to prevent rotation of the drum when secured to said support.

7. A shock absorber for spring vehicles, comprising a drum, an endless friction band encircling said drum, a belt encircling said band, a retriever spring connected to said belt and a pivoted device interposed between said belt and band adapted to press said band against the drum.

In testimony whereof I affix my signature.

WILLIAM G. COX.